UNITED STATES PATENT OFFICE.

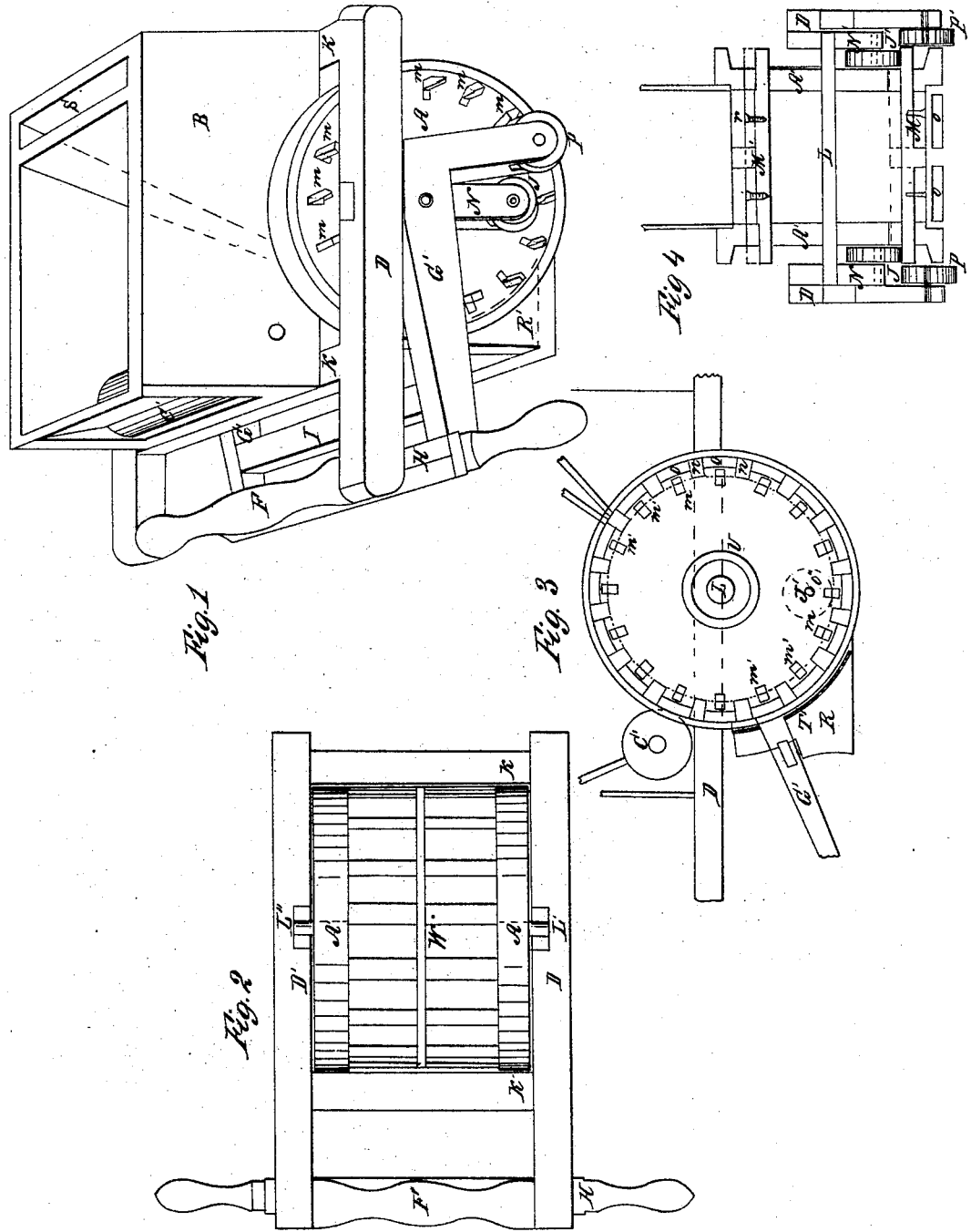
J. Hockman,
Brick Machine,
Nº 16,385.
Patented Jan. 13, 1857.

J. HOCKMAN, OF MEXICO, INDIANA.

BRICK-MACHINE.

Specification of Letters Patent No. 16,385, dated January 13, 1857.

*To all whom it may concern:*

Be it known that I, JACOB HOCKMAN, of Mexico, in the county of Miami and State of Indiana, have invented a new and Improved Mode of Making Bricks by Hand Machinery, the same being capable of being worked by horsepower; and I do hereby declare that the following is a full and exact description of the same, reference being had to the accompanying drawings and to the letters of reference marked thereon.

The nature of my invention relates to certain improvements in brick machines to be worked by hand or otherwise, as hereinafter fully described.

To enable others skilled in the art to make and use my invention I will proceed to describe its construction and operation.

I construct a frame or frames of any suitable material.

Figure 1 is a perspective view of my improved machine for making bricks. Fig. 2 is a plan of the same. Fig. 3 is a cross section of the molding cylinder, and Fig. 4 a cross section of the machine.

The same letters refer to the same parts in the different figures.

D, F, and K, the frame of the wheels and revolving cylinder and hopper, F, the handle by which the whole is moved about when in the act of molding and dropping the bricks A, A' the driving wheels attached to the molding cylinder, which are perforated with as many holes or mortises as there are divisions or molds.

$m'$, $m'$, $m'$, Fig. 3, represents the mortises in which the bars to the clearers work, and to which the clearers or bottoms of the molds are attached, by screws $r$, Fig. 4, where M', shows the position of the clearer when it is ready for filling and M, its position as the bricks $o$, $o$, leave the mold and rest on the ground, L, the axle, as the cylinder revolves the levers or bars M, M', continually come in contact with the truck J, J', which press the bricks from the molds, N, N', the standards to which the trucks are attached by the pin or bolt O'', C', C', the roller for filling the molds, R', R', the apron frame, and T, the apron which serves as a scraper to smooth the face of the brick and to guide it to the ground and may be made of zinc or other material, H, and G', G', the carriage frame on which the main frame, hopper and cylinders are placed, F, D, K, the main frame, B, the hopper, S, the water box which has a sieve or screen at its lower end, said carriage frame is supplied with trucks or wheels P, P', when the handles H, are in work and lifted up to the underside of the frame D, the wheels P, P', come in contact with the ground when the carriage frame serves as a carriage to take the molding cylinder wheels and its carriage and mortar to any part desired,—A, A', Fig. 2 the main driving wheels, W, the molding cylinder F, the handle of the main frame, and H, the handle of the under or carriage frame, and L,' L'' the journal boxes.

$m'$ $m'$ $m'$ Fig. 3, shows the ends of the levers as they project through the driving wheel in order that the truck J', may pass over them to press the bricks from the molds, U, Fig. 3, the hub of the driving wheels, and L the axle, $n$, $n$, Fig. 3, divisions between the molds $o$, $o$.

After the hopper is filled with a proper quantity of tempered clay, the operator takes hold and lifts up the handles H, thus bringing the rollers P, P, in contact with the ground, by means of which, the cylinder W, and main wheels A, A', are raised from the ground. The machine is now moved to the place designed for the reception of the molded bricks, when the handle H, is lowered so as to let the wheels A, A', rest on the ground, and as the machine is pushed or drawn along by handle F, the molded bricks are deposited evenly and without injury on the ground. Should it be required to leave a vacant space of sufficient width for a walk, &c., at proper intervals, the operator has only to raise the handle H, and bring the rollers, P, P', in contact with the ground, when the machine can be moved to any desired distance without depositing or molding any bricks.

Having thus fully described my invention, what I claim as my invention and desire to secure by Letters Patent is—

The under frame or carriage H, G', G', and trucks or rollers P, P', in combination with the main supporting wheels A, A', and rotating cylinder of molds W, when arranged to operate in the manner and for the purposes above specified.

JACOB HOCKMAN.

Attest:
  J. H. MURIEL,
  HENRY PARDIN.